(12) United States Patent
Finco

(10) Patent No.: US 11,691,821 B2
(45) Date of Patent: Jul. 4, 2023

(54) EGG CONVEYOR FOR A POULTRY PLANT AND METHOD FOR SYNCHRONIZATION OF TRACTION ASSEMBLIES IN SAID CONVEYOR

(71) Applicant: FLEXY SOCIETA' A RESPONSABILITA' LIMITATA CON SIGLIA FLEXY S.R.L., Campo San Martino (IT)

(72) Inventor: Luca Finco, Chicago, IL (US)

(73) Assignee: FLEXY SOCIETA' A RESPONSABILITA' LIMITATA CON SIGLIA FLEXY S.R.L., Campo San Martino (IT)

( * ) Notice: Subject to any disclaimer, the term of this patent is extended or adjusted under 35 U.S.C. 154(b) by 0 days.

(21) Appl. No.: 17/698,101

(22) Filed: Mar. 18, 2022

(65) Prior Publication Data
US 2022/0297944 A1    Sep. 22, 2022

(30) Foreign Application Priority Data

Mar. 18, 2021    (IT) ........................ 102021000006476

(51) Int. Cl.
*B65G 17/06*    (2006.01)
*A01K 31/16*    (2006.01)
(Continued)

(52) U.S. Cl.
CPC .......... *B65G 17/061* (2013.01); *A01K 31/165* (2013.01); *B65G 17/063* (2013.01);
(Continued)

(58) Field of Classification Search
CPC .... B65G 17/061; B65G 17/063; B65G 23/36; B65G 43/00; B65G 2201/0208;
(Continued)

(56) References Cited

U.S. PATENT DOCUMENTS 3,241,433 A * 3/1966 Niederer, Jr. ........ B65G 17/063
356/57
3,524,529 A * 8/1970 Martin ................. B65G 47/846
198/779
(Continued)

FOREIGN PATENT DOCUMENTS

DE        1189450 B    3/1965
DE        1456957 A1   6/1969
(Continued)

OTHER PUBLICATIONS

IT Search Report dated Nov. 17, 2021 re: Application No. 202100006476, pp. 1-9, citing: DE 38 00 817 C1, DE 10 2016 203816 A1, DE 11 89 450 B, EP 2 130 103 A1 and DE 14 56 957 A1.

*Primary Examiner* — Mark A Deuble
(74) *Attorney, Agent, or Firm* — Cantor Colburn LLP

(57) ABSTRACT

An egg conveyor for a poultry plant
  includes a chain of the closed-loop type with bars, for conveying eggs from one or more laying hen sheds to a collection location,
  assemblies for traction along the chain which are provided with a motor drive component, and
  a control unit for synchronization of the traction assemblies. The motor drive components each include at least one gearmotor provided at least with a corresponding servomotor.
The method for synchronization of traction assemblies in the conveyor includes the following steps:
  detecting continuously and instantaneously the angular position and the number of bars at each traction assembly, and
  calculating continuously and instantaneously the average of all the torques at the traction assemblies and, if the number of bars is different from a set number, (Continued)

correcting the speed of each servomotor to obtain a constant torque on each traction assembly, which corresponds to the average.

6 Claims, 3 Drawing Sheets

(51) Int. Cl.
*B65G 23/36* (2006.01)
*B65G 43/00* (2006.01)

(52) U.S. Cl.
CPC ............. *B65G 23/36* (2013.01); *B65G 43/00* (2013.01); *B65G 2201/0208* (2013.01); *B65G 2811/095* (2013.01)

(58) Field of Classification Search
CPC .. B65G 2811/095; B65G 23/32; B65G 23/10; B65G 23/44; A01K 31/165
See application file for complete search history.

(56) References Cited

U.S. PATENT DOCUMENTS

| | | | | |
|---|---|---|---|---|
| 4,244,464 | A * | 1/1981 | van Capelleveen | B65G 17/063 198/848 |
| 5,402,879 | A * | 4/1995 | Briehl | B65G 23/36 198/832 |
| 7,255,224 | B2 * | 8/2007 | Doornekamp | B65G 17/063 198/779 |
| 9,540,176 | B2 * | 1/2017 | Matsuzaki | B65G 23/06 |
| 9,663,297 | B1 * | 5/2017 | Steinhoff | B65G 17/063 |
| 2008/0017483 | A1 * | 1/2008 | Lago | B65G 17/063 198/853 |
| 2012/0043187 | A1 * | 2/2012 | McCormick | B65G 17/063 198/851 |

FOREIGN PATENT DOCUMENTS

| | | |
|---|---|---|
| DE | 3800817 C1 | 4/1989 |
| DE | 102016203816 A1 | 9/2017 |
| EP | 2130103 A1 | 12/2009 |

* cited by examiner

EGG CONVEYOR FOR A POULTRY PLANT AND METHOD FOR SYNCHRONIZATION OF TRACTION ASSEMBLIES IN SAID CONVEYOR

CROSS-REFERENCE TO RELATED APPLICATIONS

This application is related to and claims the benefit of Italian Patent Application No. 102021000006476, filed on Mar. 18, 2021, the contents of which are herein incorporated by reference in their entirety.

TECHNICAL FIELD

The present disclosure relates to an egg conveyor for a poultry plant and to a method for synchronization of traction assemblies in such conveyor.

BACKGROUND

In poultry egg collection plants there are one or more laying hen sheds from which the eggs are collected and a shed where the eggs are conveyed to be sorted and packaged.

The conveyance of the eggs from the various hen sheds to the destination shed occurs by means of one or more conveyors.

Currently, chain conveyors, with a closed loop supported by a metal frame, with two mutually opposite chains with links sliding on guides made of low-friction plastic material, are widely used; the eggs are conveyed by transverse bars which are integral with the links of the two chains and there are intermediate chain traction assemblies.

Based on the size and location of the sheds in poultry plants, the conveyors can cover paths with bends and with ascending and descending slopes and can exceed one hundred meters in length.

In order to ensure conveyance of the eggs so as to limit collisions and breakages, it is preferable to use a single conveyor.

Along the chain, multiple sheds unload the eggs at various points of the chain, and therefore the load on it is not uniform along its length and differences in traction speed occur. With variable load situations, each intermediate assembly pulls the chain with different forces.

The system works efficiently if the chain does not exceed its traction limit and if it does not get jammed in the guides. However, the different loads can cause the spacing of the chain links to be uneven. As a result, different chain portions do not have the same length and therefore the chain is overstretched or accumulates between two intermediate traction assemblies. Currently, this drawback is obviated by an accumulation control, i.e., with a system adapted to detect any accumulation of the chain bars and to manage the temporary motor stop of one or more traction assemblies for the time necessary to resume correct chain tension.

However, this solution, besides entailing abrupt stops to the system, is not sufficient for chain lengths of over one hundred meters. In order to be able to cover greater lengths it is necessary to add auxiliary chain modules, known as transfer stations, to be interposed between chain portions. The flow of the eggs, in the transition between two conveyors, encounters speed differences and discontinuities that can cause cracks and microfractures of the shell.

SUMMARY

The aim of the present disclosure is to provide a chain-type egg conveyor for a poultry plant that is capable of improving the background art in one or more of the aspects mentioned above.

Within this aim, the disclosure provides an egg conveyor that is suitable to cover lengths exceeding one hundred meters without transfer stations.

The disclosure provides an egg conveyor which works efficiently even when the load along the chain is uneven.

The disclosure provides a conveyor with which it is possible to prevent situations of chain accumulation and motor stops.

Moreover, the present disclosure overcomes the drawbacks of the background art in a manner that is alternative to any existing solutions.

Not the least object of the disclosure is to provide a conveyor that is highly reliable, relatively easy to provide and has competitive costs.

This aim and these and other advantages which will become more apparent hereinafter are achieved by providing an egg conveyor for a poultry plant, comprising:
  a chain of the closed-loop type with bars, for conveying eggs from one or more laying hen sheds to a collection location,
  assemblies for traction along said chain which are provided with motor drive means,
  said conveyor being characterized in that it comprises a control unit for the synchronization of said traction assemblies, said motor drive means each comprising at least one gearmotor provided at least with a corresponding servomotor.

The disclosure also relates to a method for synchronization of traction assemblies in a conveyor as above mentioned, which comprises:
  detecting continuously and instantaneously the angular position and the number of bars at each said traction assembly,
  calculating continuously and instantaneously the average of all the torques at the traction assemblies and, if the number of bars is different from a set number, correcting the speed of each said servomotor so as to obtain a constant torque on each said traction assembly, which corresponds to the average.

BRIEF DESCRIPTION OF THE DRAWINGS

Further characteristics and advantages of the disclosure will become more apparent from the description of a preferred but not exclusive embodiment of the conveyor according to the disclosure, illustrated by way of non-limiting example in the accompanying drawings, wherein.

DETAILED DESCRIPTION OF THE DRAWINGS

Figure 1:
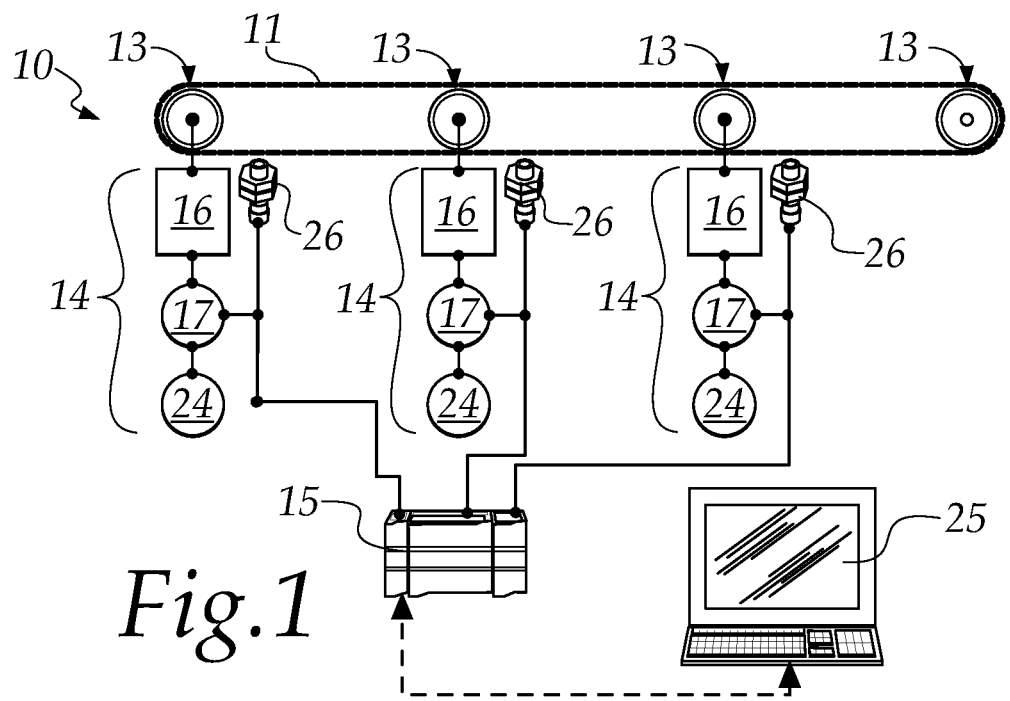
FIG. 1 is a schematic view of the conveyor according to the disclosure.

With reference to the figures, the conveyor according to the disclosure is shown schematically and designated generally by the reference numeral 10. It comprises:

a chain 11 of the closed-loop type with bars 12, for conveying eggs from one or more laying hen sheds to a collection location, traction assemblies 13 along the chain 11 which are provided with motor drive means 14, a control unit 15 for the synchronization of the traction assemblies 13.

The motor drive means 14 comprise each at least one gearmotor 16 provided at least with a corresponding servomotor 17.

The position of the traction assemblies 13 and their distance is defined as a function of the path of the conveyor and depends on the presence and the number of turns and ascending and descending slopes.

Figure 2:
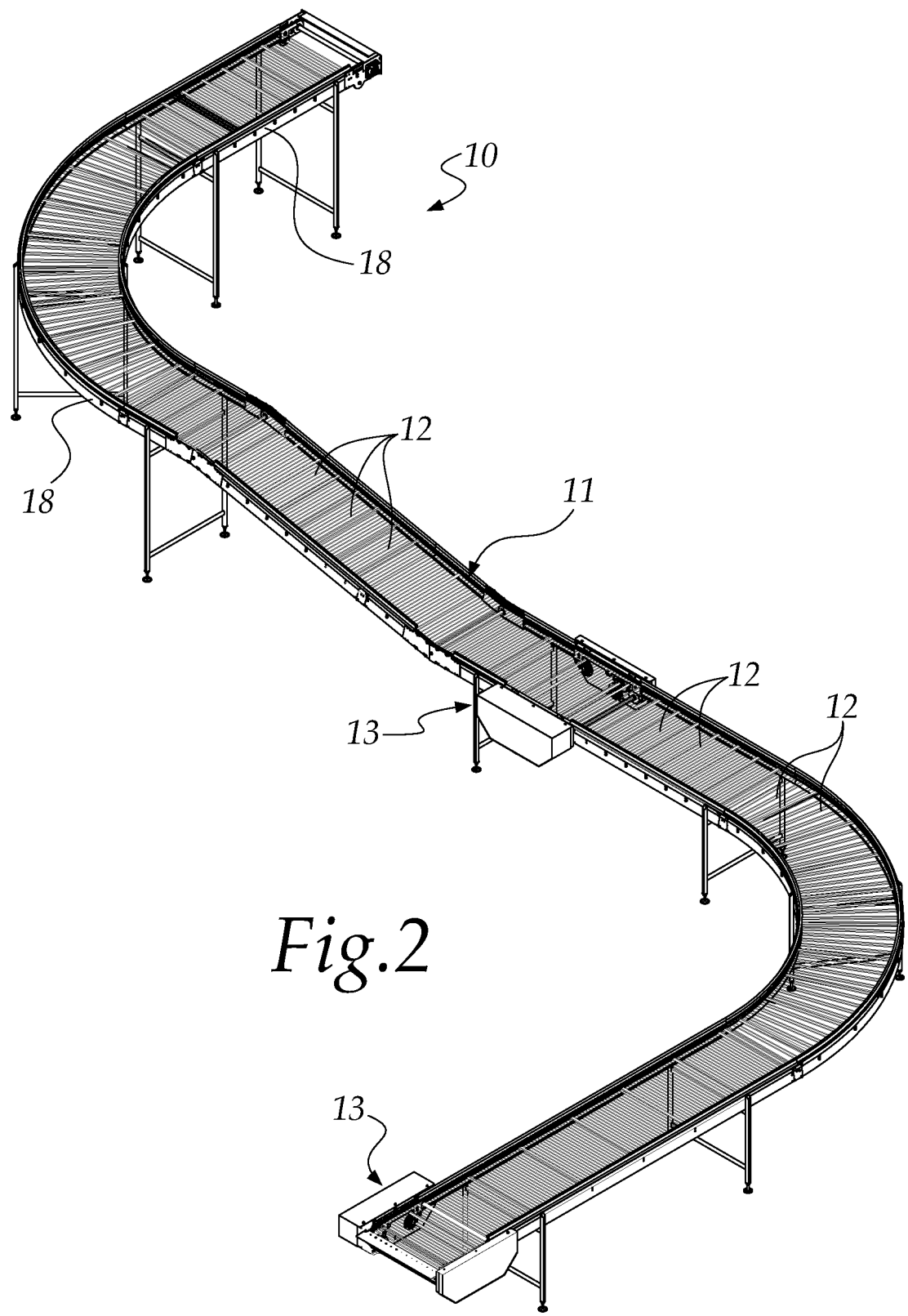
FIG. 2 is a view of a conveyor portion according to the disclosure.

FIG. 2 shows a portion of the conveyor 10 in a perspective view, to identify the type of conveyance system concerned; it is possible to note, in addition to a frame for supporting the structure and guides 18, the bars 12, only some of which are indicated, for the sake of simplicity, and the traction assemblies 13.

Two mutually opposite chains with links 19 slide on the guides 18 and the transverse bars 12 are integral with the links 19 of the two chains.

Figure 3:
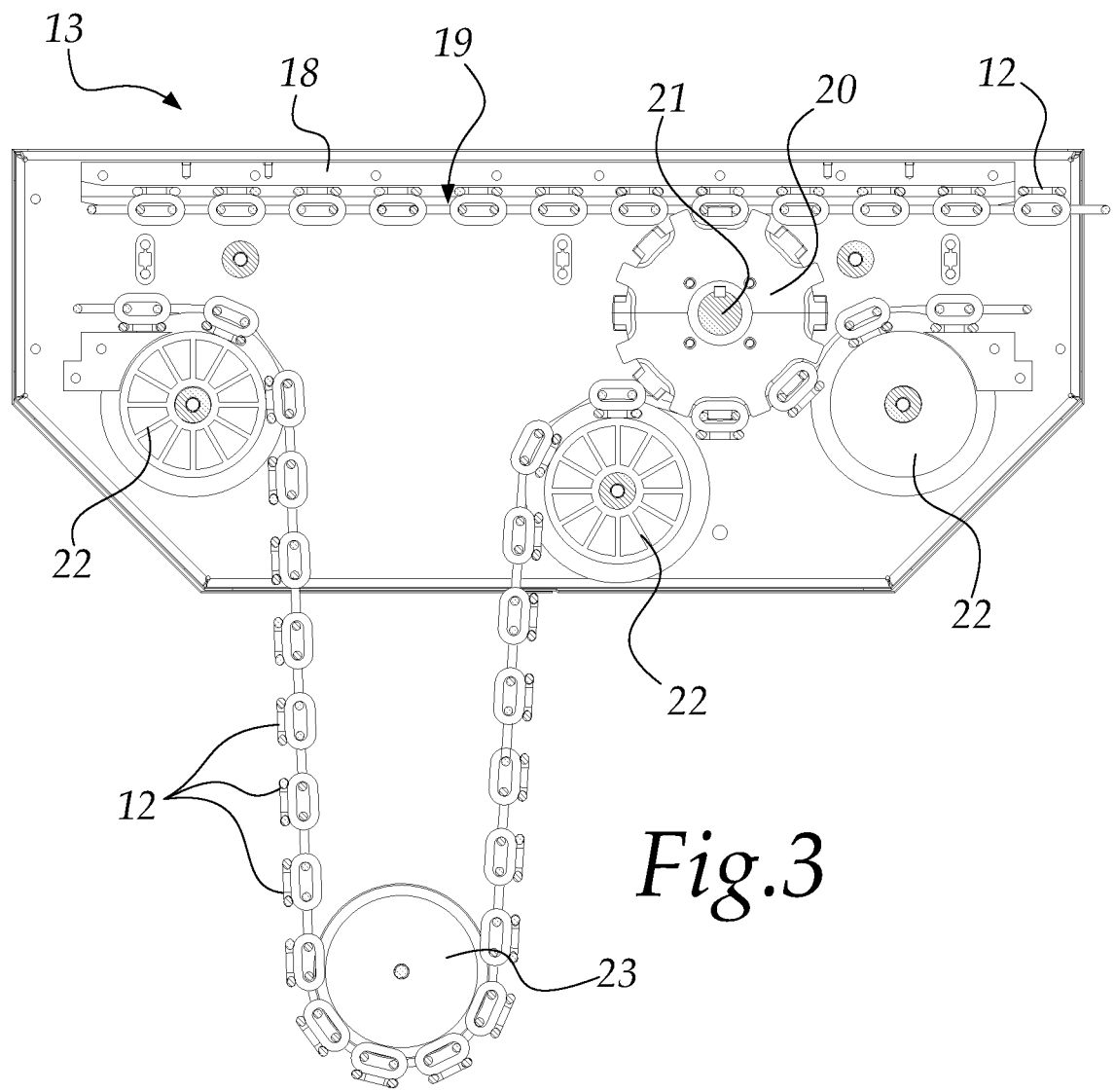
FIG. 3 is a view of the gears at a traction assembly of the conveyor according to the disclosure.

FIG. 3 shows from the inner side the gear of an intermediate traction assembly 13. The links of one of the mutually opposite chains with links 19 are visible above and below, this being a closed chain, and the bars 12 are shown in cross-section. A gear 20 is turned by a shaft 21 conveniently connected to the gearmotor 16 and this in turn, by entering the links with the teeth, pushes the chain, both in the lower part and in the upper part. Idle wheels 22 are also visible which have grooves for the passage of the links and a counterweight, also with a wheel 23, in order to prevent the gear 20 from entraining more links than appropriate in its rotation, which is counter-clockwise with respect to the view shown.

As shown schematically in FIG. 1, each servomotor 17 is provided with an angular position transducer 24, for example an encoder or the like.

The control unit 15, conveniently connected to a computer 25, is preferably constituted by a system of the PLC type and manages a multiple-axis system for the control and synchronization of motion, which comprises a master axis, which is virtual, and slave axes, which are located at the motor drive means 14, the master axis acting as a reference for the motion of the slave axes.

In particular, the gearmotors 16 are managed by the respective servomotors 17, which are in turn coordinated by the control unit 15. Each servomotor 17, by means of an encoder 24, acquires the angular position feedback and, by means of a sensor 26, the count of the bars of the chain 11 and makes this information available to the control unit 15.

The control unit 15 manages the master axis according to the working speed of the conveyor. This is in fact a parameter of the PLC set by means of the computer 25. The slave axes, and therefore the servomotors at the traction assemblies, are connected in an electric servo mode to the virtual axis. Substantially in order to mutually synchronize the slave axes, therefore the servomotors, they are all synchronized with the virtual axis.

The control unit 15 manages therefore the synchronization between the master axis and the slave axes, with a 1:1 target following ratio between master and slaves. The system moves therefore in a synchronous manner, following the master which is its reference. In order to increase and reduce the tension of the chain 11 between one axis and the other, one acts on the following ratio, to be determined as a function of the torque and the count of the bars, which are data provided by the respective servomotor 17.

Substantially, the control unit 15, once it has received the information from the servomotors 17, calculates the arithmetic average of all the torques and corrects infinitesimally the position, therefore the speed, of each servomotor in order to obtain a more or less constant torque on each slave, corresponding to the average. The result is that each one of them contributes to tension the chain in an even manner, wherein all the motors contribute in the same manner, with the same force (the 1:1 following ratio being established) and at the same speed. The control unit 15 calculates the average continuously and, if the counting of the bars 12 detects offsets, applies the corrections by acting on the servomotors 17.

The instantaneous and continuous correction of the speed makes it possible to stress less the chain and the mechanical elements of the traction assemblies, for example the toothed pulleys, avoiding continuous stop and restarts, to increase the maximum length of the chain and to optimize the distribution of the flow of eggs, ensuring the supply of eggs required in real time by the packaging machine in the collection shed.

By preventing the chain 11 from tending to be tensioned too much or to accumulate between two traction assemblies 13, said chain can cover greater lengths than it is possible with chain conveyors of the known type.

Figure 4:
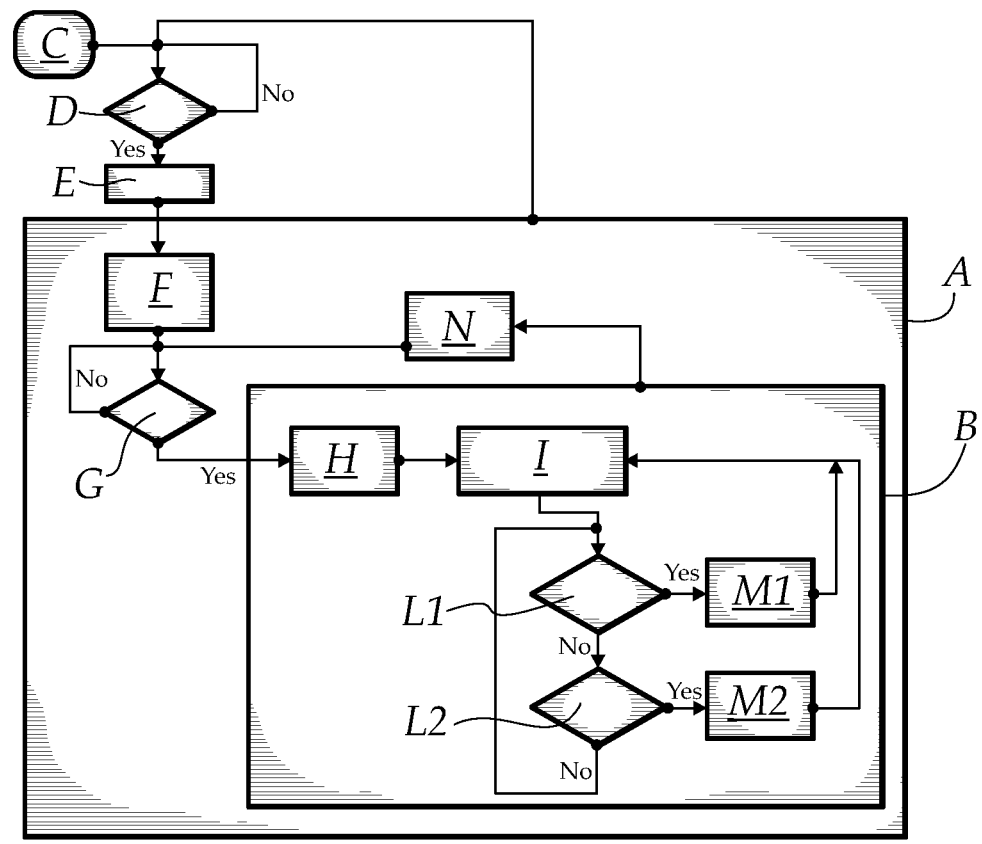
FIG. 4 is a block diagram showing the operating logic of the conveyor according to the disclosure.

FIG. 4 shows with a block diagram the operating logic of the conveyor 10 and particularly of the control unit 15.

The box A collects the operations in which the control unit 15 is active, while the box B collects those that not only are within the box A but are also related to the management of the multiple-axis system for the synchronization and control of the motion.

The box C represents the activation of the control system. The activation is verified in the box D and in a positive case the control unit 15 and the multiple-axis system are enabled in the following box E. At any moment, in case of deactivation, the logic goes back to the box C.

The box F designates the setting, by the control unit 15, of a 1:1 following ratio between master and slaves. The subsequent box G is the request to perform the multiple-axis management.

The box H designates the step of activation of the multiple-axis management and therefore the actual control of the PLC system. With the activation, in the box I, the control unit 15 performs the calculation of the arithmetic average of all the torques and in the subsequent box L1 verifies whether, and for which traction assemblies 13, it is greater than the set average. If it is, in the following step, designated at the box M1, the unit commands a reduction of the following ratio. The average of the torques is calculated continuously and therefore, also as a consequence of the reduction, the logic goes back to the step of the box I. If, instead, the calculated average is not greater, in the box L2 the control unit 15 verifies whether it is lower and in a positive case in the subsequent step, designated in the box M2, the unit commands an increase of the following ratio. In a negative case, it goes back to the verification of the calculated average at the box I. Multiple-axis management is interrupted at the box N, at the request for execution in the box G.

The synchronization method according to the disclosure includes the following steps:

detecting continuously and instantaneously the angular position and the number of bars at each traction assembly 13 (therefore, angular position at the gearmotors)

calculating continuously and instantaneously the average of all the torques at the traction assemblies 13 and, if the number of bars 12 is greater than a set number, correcting the speed of each servomotor 17 so as to obtain a constant torque on each traction assembly 13, which corresponds to the average.

This speed calculation and correction step occurs by synchronizing, with a multi-axis system and with a 1:1 target following ratio, the master axis and the slave axes, in the manner described previously.

The operation of the conveyor, according to the disclosure, is evident from what has been described and shown and in particular it is evident that it allows a continuous, instantaneous and simultaneous control of the speed at all the traction assemblies, making the conveyor more efficient.

In practice it has been found that the disclosure achieves the intended aim and advantages, providing an egg conveyor for a poultry plant suitable to cover lengths exceeding one hundred meters without transfer stations and capable of working efficiently despite the presence of uneven loads along the chain, preventing situations of accumulation of the chain or excessive tensioning and motor stops.

The disclosure thus conceived is susceptible of numerous modifications and variations, all of which are within the scope of the appended claims; all the details may furthermore be replaced with other technically equivalent elements.

In practice, the materials used, as long as they are compatible with the specific use, as well as the contingent shapes and dimensions, may be any according to the requirements and the state of the art.

What is claimed is:

1. An egg conveyor for a poultry plant, comprising:
   a closed-loop chain with bars configured for conveying eggs from one or more laying hen sheds to a collection location,
   traction assemblies for traction along said chain provided with motor drive means, and
   a control unit for a synchronization of said traction assemblies, said motor drive means each comprising at least one gearmotor provided at least with a corresponding servomotor.

2. The conveyor according to claim 1, wherein said servomotor is provided with an angular position transducer.

3. The conveyor according to claim 1, wherein said control unit manages a multiple-axis system for control and synchronization of motion, which comprises a master axis which is virtual and slave axes which are located at said motor drive means, said master axis configured as a reference for motion of said slave axes.

4. The conveyor according to claim 1, wherein said control unit is constituted by a PLC system.

5. A method for synchronization of traction assemblies in a conveyor according to claim 1, the method includes the following steps:
   detecting continuously and instantaneously an angular position and a number of bars at each said traction assembly, and
   calculating continuously and instantaneously an average of all torques at the traction assemblies and, if the number of bars is different from a set number, correcting a speed of each said servomotor so as to obtain a constant torque on each said traction assembly, which corresponds to the average.

6. The method according to claim 5, wherein the speed calculation and correction step occurs by synchronizing, with a multi-axis system and with a 1:1 target following ratio, the master axis and the slave axes.

* * * * *